C. H. KICKLIGHTER.
APPARATUS FOR ELECTRIC WELDING.
APPLICATION FILED JUNE 15, 1914.

1,252,809.

Patented Jan. 8, 1918.

WITNESSES:
N. A. Stevens.
E. H. Stevens.

INVENTOR
Charles H. Kicklighter.

UNITED STATES PATENT OFFICE.

CHARLES H. KICKLIGHTER, OF ATLANTA, GEORGIA.

APPARATUS FOR ELECTRIC WELDING.

1,252,809.  Specification of Letters Patent.  Patented Jan. 8, 1918.

Original application filed January 26, 1914, Serial No. 814,384. Divided and this application filed June 15, 1914. Serial No. 845,066.

*To all whom it may concern:*

Be it known that I, CHARLES H. KICKLIGHTER, a citizen of the United States, residing at Atlanta, in the county of Fulton and State of Georgia, have invented new and useful Improvements in Apparatus for Electric Welding, of which the following is a specification.

This application is a part of the original application, Ser. No. 814,384, filed January 26, 1914. The pending portion of this application relates primarily to a method of forming a seam, while the present application has to do more particularly with an apparatus for making such a seam and the method of operation of said apparatus.

The invention relates to a method of and apparatus for electrically welding seams of various kinds in plate and sheet metal work. The method is to roll on the seam a roller or annular shaped electric terminal of the revolving secondary of a welding transformer. In the case herein described, the method is to roll on the opposite sides of the seam rollers or annular shaped electric terminals of the revolving secondaries of two transformers,—these secondaries being connected in series.

In the previous art a variety of seams have been designed for connecting plates and metal sheets by the electric welding process. In a number of these, a step-by-step method has been employed, consisting in simultaneously forcing two pressure blocks toward each other on opposite sides of the plates and passing an electric heating current between them. Rollers rotating on bearings or pressing against brushes have been employed to force the plates together and communicate the welding current to and through the plate. These have not given satisfaction, because it has been necessary to pass the heavy welding current through sliding contacts to the rollers.

The object of the present invention is to provide a continuous and uninterrupted welding process from one end of the seam to the other, if desired. It is also apparent that much time and labor are saved. The seam can be made more uniform, and the flow of welding current is continuous instead of being drawn by intermittent surges.

In the accompanying:

Figure 1:
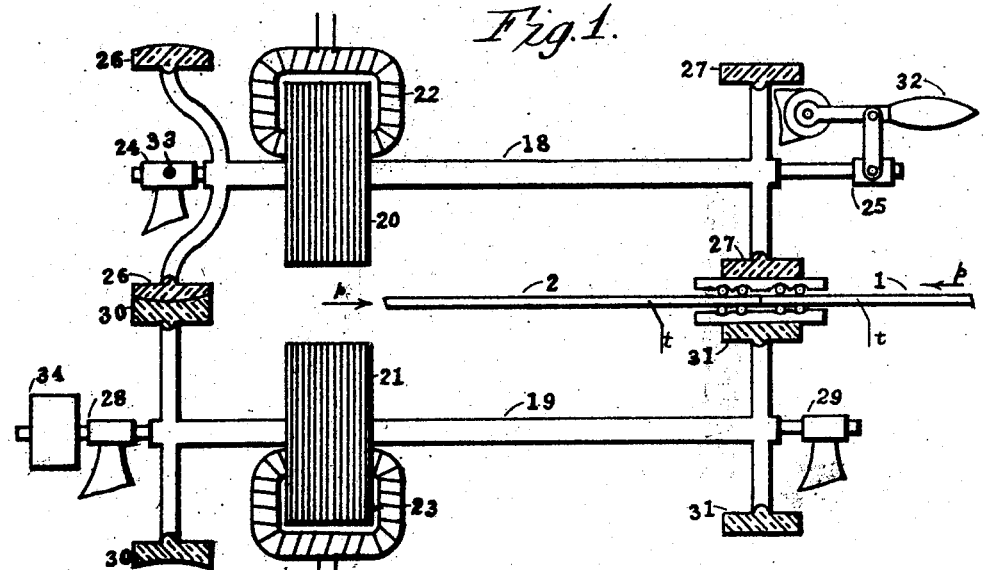
Figure 1 is a sketch illustrating in elevation a method for passing a seam between the annular terminals of two rotating transformer secondaries.

Fig. 1 illustrates the use of two welder transformer secondaries 18—19 with laminated cores 20—21 and primary windings 22—23. The secondary 18 is mounted upon a shaft supported by bearings 24—25, and is provided with annular rim-shaped terminals 26—27. The secondary 19 is mounted upon a shaft supported by bearings 28—29 and is provided with annular rim-shaped terminals 30—31. The terminals 27 and 31 are adapted to roll along the joint and subject the same to mechanical pressure and heavy electric current. Lever 32 or other mechanical means is provided for forcing terminal 27 down upon the work. As the secondary 18 must have a slight motion about the center 33, a self-alining bearing 24 should be provided and the rolling surfaces of terminals 26—30 should be curved. The surface of 26 should be the portion of a spherical surface with 33 as a center. Surface of terminal 30 should be made so as to conform with and engage this. Pulley 34 is employed to revolve the secondary 19 as the plate joint is fed between roller terminals 27—31. Both secondaries 18 and 19 revolve during the welding operation. The transformer cores 20—21 and the primaries 22—23 are stationary and are supported by the machine's frame. The path of the welding current is through 31, 19, 30, 26, 18, 27, and through the joint being welded back to 31. Fig. 1 can be easily modified and simplified by omitting either of the transformer cores and coils, say 20—22. The revolving secondary 18 then becomes simply a conductor for completing the circuit of secondary 19 through the work interposed between rims 27—31.

Figure 2:
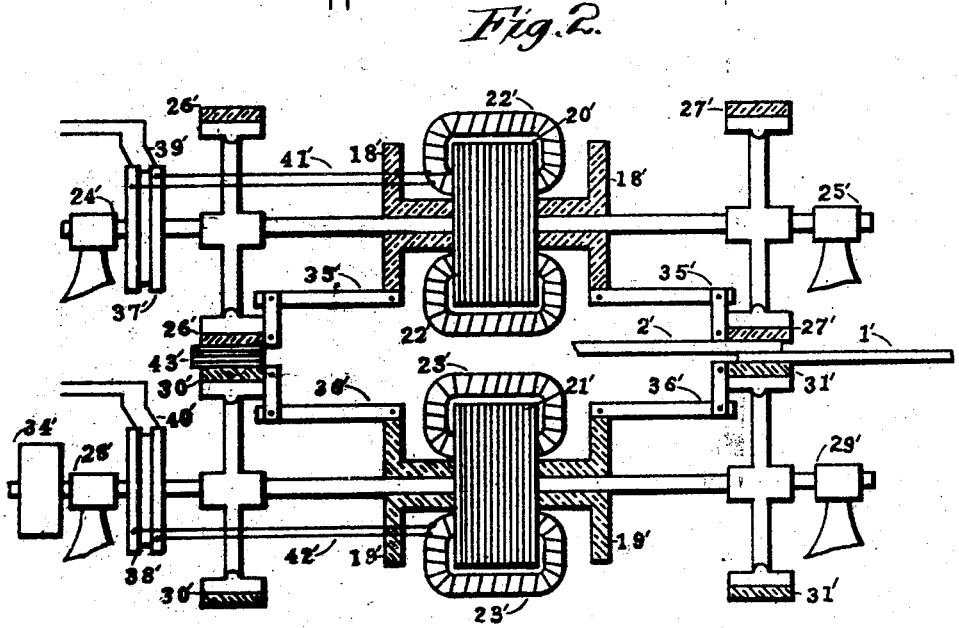
Fig. 2 is a modification of Fig. 1, illustrating the passing of a seam between the annular terminals of two rotating transformers.

In Fig. 2 a similar device is employed. Two welding transformers with secondaries 18'—19', laminated cores 20'—21' and primaries 22'—23' are mounted upon shafts, bearing at 24'—25' and 28'—29', respectively. The annular rims 26'—27' form the rolling terminals of secondary 18' and are connected thereto by bars 35'—35'. The annular rims 30'—31' form the rolling terminals of secondary 19' and are connected thereto by bars 36'—36'. As all parts of the transformers in this case are mounted on the shafts and rotate therewith, slip rings 37'—38' and brushes 39'—40' are employed to connect with the source of pressure supply. Slip rings 37' are connected to transformer primary 22' by leads 41'. Slip rings 40' are connected to transformer primary 23' by lead 42'. The terminal rims 27'—31' are adapted to roll along the joint to be welded and to subject the same to mechanical pressure and heating electric current. The terminal rims 26'—30' are adapted to act similarly on a similar parallel joint, or possibly a part of the same joint. Provision can be made for varying and adjusting the distance between rims 26'—27' and between rims 30'—31' by moving the wheel mountings along the supporting shafts. A bar or strips of copper 43' may be passed between rolling terminals 26'—30' while the plate joint is passing between terminals 27'—31'. The function of the copper bar or strips is to complete the circuit through secondaries 18'—19' and to preserve the proper alinement of the revolving parts. The path of the welding current is 31', 36', 19' 30', 43', 26', 35', 18', 35', 27' and through the joint being welded back to 31'.

In many cases strips or ribbons of sheet copper may be used with advantage to feed between the rolling annular terminals and the plate joint being welded. These will serve two purposes,—first, to concentrate and limit the pressure and current to the place where it is needed,—second, to increase the area of contact with the welts or plates.

What I claim is:

1. An apparatus for electric heating or welding, comprising a primary winding, a secondary member inductively related thereto, a terminal or terminals integrally mounted upon said secondary member, and means for rotating said secondary member and said terminal or terminals relative to the primary winding.

2. An apparatus for fastening metals together, comprising a core of laminated metallic material and conductors for carrying the heating current around said core, wheel shaped or annular terminals mounted upon said conductors and rotatable therewith and means for rotating said conductors and terminals and rolling the terminals one relative to the other.

3. In an apparatus for fastening metals together, the combination with a core of laminated metallic material and a conductor for carrying the heating electric current through, or around, said core, of a terminal mounted upon said conductor and rotatable therewith, and means for rotating said conductor and terminal relative to said core.

4. In an alternating current transformer, the combination of rotary secondary members for carrying a current, terminals for applying said current mounted upon said secondaries and rotatable therewith, and means for rolling one of said terminals relative to the other.

5. An apparatus for electric heating or welding, comprising a rotating transformer secondary and a rotating conductor in series therewith for conveying a heating or welding current, the poles of said transformer secondary terminating in a pair of conducting roller contact rings, one of said rings being adapted to contact with the said rotary conductor and the other of said rings being adapted to apply the said heating or welding current.

6. An apparatus for electric heating or welding comprising a rotating transformer secondary and a conductor in series therewith for conveying a heating or welding current, the poles of said transformer secondary terminating in a pair of conducting roller contact rings, one of said rings being adapted to contact with the said conductor and the other of said rings being adapted to apply the said heat or welding current.

7. An apparatus for electric heating or welding comprising a rotating transformer secondary and a conductor in series therewith for conveying the heating or welding current around metallic material, the poles of said transformer secondary terminating in a pair of conducting roller contact rings one of said rings being adapted to contact with the said conductor and the other of said rings being adapted to apply the said heating or welding current.

8. An apparatus for electric heating or welding comprising a rotating transformer secondary and a conductor in series therewith for conveying the heating or welding current around metallic material, one of the poles of said transformer secondary being adapted to contact with said conductor and the other pole being adapted to apply the heating or welding current.

9. An apparatus for electric heating or welding, comprising a rotating transformer secondary and a conductor in series therewith for conveying the heating or welding current around metallic material, one of the poles of each of said secondary and said conductor being adapted to come into mutual contact and the other poles of said secondary and said conductor being oppositely disposed and adapted to apply the heating or welding current.

10. An apparatus for electric heating or welding comprising two rotating transformer secondaries, a pole of each terminating in a roller contact, said contacts being adapted to apply the heating or welding current to directly opposite sides of the work.

11. An apparatus for electric heating or welding metal plates, comprising two rotating transformer secondaries, the poles each of said secondaries terminating in a pair of conducting roller contact rings and two of said contact rings being adapted to apply the heating or welding current to opposite sides of the plates.

12. An apparatus for electric heating or welding, comprising a rotating transformer secondary and a rotating conductor for conveying the heating or welding current, a pole of each of said secondary and said conductor terminating in a roller contact ring, these rings being adapted to apply the heating or welding current to opposite sides of the work.

13. An apparatus for electric heating or welding metal plates, comprising a rotating transformer secondary and a rotating conductor for conveying the heating or welding current, the poles of said transformer secondary terminating in a pair of conducting roller contact rings, said rotating conductor terminating in a pair of conducting roller contact rings and two of said contact rings being adapted to apply the heating or welding current to opposite sides of the plates.

14. An apparatus for electric heating or welding metal plates, comprising a transformer with a pole of its secondary adapted to apply the heating or welding current to one side of a plate, and a rotating conductor for conveying the heating or welding current with poles terminating in roller contact rings, one of said rings being adapted to communicate the current to the said transformer secondary and the other of said rings to apply the heating or welding current to the opposite side of the plate.

15. An apparatus for electric heating or welding, comprising a rotating transformer secondary and a rotating conductor for conveying the heating or welding current, a pole of each of said secondary and said conductor being adapted to roll in mutual contact, and a pole of each of said secondary and said conductor being adapted to apply the heating or welding current to opposite sides of the work.

16. An apparatus for electric welding or heating, comprising two rotating transformer secondaries, a pole of each terminating in a roller contact, said contacts being adapted to apply to directly opposite sides of the work.

17. An apparatus for electric heating or welding, comprising a rotating transformer secondary and a rotating conductor for conveying heating or welding current, a pole of each of said secondary and said conductor terminating in a roller contact, said contacts being adapted to apply to directly opposite sides of the work.

18. An apparatus for electric heating or welding, comprising a transformer secondary and a rotating conductor for conveying heating or welding current, a pole of said conductor terminating in a roller contact, said contact being adapted to apply to the directly opposite side of the work from the pole of said transformer secondary.

19. An apparatus for electric heating or welding, comprising a rotating transformer secondary and a rotating conductor for conveying heating or welding current, the poles of said transformer secondary terminating in a pair of conducting roller contact rings, one of said contact rings and a portion of the rotating conductor being adapted to apply the heating or welding current to directly opposite sides of the work.

CHARLES H. KICKLIGHTER.

Witnesses:
  W. A. Stevens,
  E. H. Stevens.

Copies of this patent may be obtained for five cents each, by addressing the "Commissioner of Patents, Washington, D. C."